US012641226B2

(12) United States Patent   (10) Patent No.:  US 12,641,226 B2

Hu et al.   (45) Date of Patent:  May 26, 2026

(54) ADAPTIVE VIDEO FILTER

(71) Applicant: QUALCOMM Incorporated, San Diego, CA (US)

(72) Inventors: Nan Hu, San Diego, CA (US); Marta Karczewicz, San Diego, CA (US); Vadim Seregin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/826,793

(22) Filed: Sep. 6, 2024

(65) Prior Publication Data

US 2025/0119539 A1    Apr. 10, 2025

Related U.S. Application Data

(60) Provisional application No. 63/588,071, filed on Oct. 5, 2023.

(51) Int. Cl.
| | |
|---|---|
| *H04N 19/117* | (2014.01) |
| *H04N 19/82* | (2014.01) |
| *H04N 19/86* | (2014.01) |

(52) U.S. Cl.
CPC ........... *H04N 19/117* (2014.11); *H04N 19/82* (2014.11); *H04N 19/86* (2014.11)

(58) Field of Classification Search
CPC .................................................. H04N 19/117
USPC .................................................. 375/240.02
See application file for complete search history.

(56) References Cited

U.S. PATENT DOCUMENTS

| | | | |
|---|---|---|---|
| 2020/0204801 A1 | 6/2020 | Hu et al. | |
| 2020/0296365 A1* | 9/2020 | Chen .................... | H04N 19/117 |
| 2021/0195182 A1 | 6/2021 | Du et al. | |
| 2021/0218962 A1 | 7/2021 | Lim et al. | |
| 2022/0078415 A1 | 3/2022 | Taquet et al. | |
| 2022/0201292 A1 | 6/2022 | Karczewicz et al. | |
| 2022/0295053 A1 | 9/2022 | Du et al. | |
| 2023/0010869 A1 | 1/2023 | Hu et al. | |

(Continued)

OTHER PUBLICATIONS

Bytedance Inc: "Non-EE2: Extended Usage of Fixed Filters", 35. JVET Meeting; Jul. 12, 2024-Jul. 19, 2024, Sapporo; (The Joint Video Exploration Team of ISO/IEC JTC1/SC29/WG11 and ITU-T SG.16 ), No. JVET-AI0135, doc v0, Jul. 5, 2024, 3 Pages, XP030320364, the whole document.

(Continued)

*Primary Examiner* — Amir Shahnami

(74) *Attorney, Agent, or Firm* — Shumaker & Sieffert, P. A.

(57) ABSTRACT

A video coder may receive video data, and apply a filter to a plurality of categories of samples of the video data. The plurality of categories of samples may include two or more of an input of a fixed filter, an output of the fixed filter, an input of a signaled filter, an output of the signaled filter, an input of an adaptive loop filter, an output of the adaptive loop filter, an input of a sample adaptive offset (SAO) filter, an output of the SAO filter, an input of a bilateral filter, an output of the bilateral filter, an input of a cross component SAO filter, an output of the cross component SAO filter, an input of a deblocking filter, an output of the deblocking filter, filtered reconstructed residual data, dequantized coefficients, filtered dequantized coefficients, a predictor, or a filtered predictor.

18 Claims, 10 Drawing Sheets

(56)  References Cited

U.S. PATENT DOCUMENTS

| | | |
|---|---|---|
| 2024/0031567 A1 | 1/2024 | Chen et al. |
| 2024/0357095 A1 | 10/2024 | Karczewicz et al. |
| 2024/0430488 A1 | 12/2024 | Zhou et al. |

OTHER PUBLICATIONS

International Search Report and Written Opinion—PCT/US2024/045869—ISA/EPO—Dec. 5, 2024.
Qualcomm Incorporated: "Non-EE2: Applying Fixed Filters to Output of the Gaussian Filter", 32. Jvet Meeting, Oct. 13, 2023-Oct. 20, 2023; Hannover, (The Joint Video Exploration Team of ISO/IEC JTC1/SC29/WG11 and ITU-T SG.16 ), No. JVET-AF0178-v2, Oct. 15, 2023, 2 Pages, XP030312340, the whole document.
Chang Y-J., et al., "Compression Efficiency Methods Beyond VVC", JVET-U0100, Joint Video Experts Team (JVET) of ITU-T SG 16 WP 3 and ISO/IEC JTC 1/SC 29 21st Meeting, by teleconference, Jan. 6-15, 2021, pp. 1-13.
Coban M., et al., "Algorithm Description of Enhanced Compression Model 10 (ECM 10)", JVET-AE2025, Joint Video Experts Team (JVET) of ITU-T SG 16 WP 3 and ISO/IEC JTC 1/SC 29, 31st Meeting, Geneva, CH, Jul. 11-19, 2023, pp. 1-83, Oct. 29, 2023, XP030313627, the whole document.
Coban M., et al., "Algorithm Description of Enhanced Compression Model 9 (ECM 9)", JVET-AD2025, Joint Video Experts Team (JVET) of ITU-T SG 16 WP 3 and ISO/IEC JTC 1/SC 29 30th Meeting, Antalya, TR, Apr. 21-28, 2023, pp. 1-76.
Hu N., et al., "Non-EE2: Fixed filter for Chroma ALF", JVET-AF0179-v2, Joint Video Experts Team (JVET) of ITU-T SG 16 WP 3 and ISO/IEC JTC 1/SC 29, 32nd Meeting, Hannover, DE, Oct. 13-20, 2023, pp. 1-3.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.
Karczewicz M., et al., "Common Test Conditions and Evaluation Procedures for Enhanced Compression Tool Testing", JVET-AE2017-v1, Joint Video Experts Team (JVET) of ITU-T SG 16 WP 3 and ISO/IEC JTC 1/SC 29, 31st Meeting, Geneva, CH, Jul. 11-19, 2023, pp. 1-12.
Karczewicz M., et al., "Common Test Conditions and Evaluation Procedures for Enhanced Compression Tool Testing", JVET-Y2017-v1, Joint Video Experts Team (JVET) of ITU-T SG 16 WP 3 and ISO/IEC JTC 1/SC 29, 25th Meeting, by teleconference, Jan. 12-21, 2022, pp. 1-12.
Karczewicz M., et al., "Common Test Conditions and Evaluation Procedures for Enhanced Compression Tool Testing", JVET-Y2017-v3, Joint Video Experts Team (JVET) of ITU-T SG 16 WP 3 and ISO/IEC JTC 1/SC 29, 30th Meeting, Antalya, TR, Apr. 21-28, 2023, pp. 1-12.
Karczewicz M., et al., "EE2-5.2: Improved Fixed Filters for ALF", JVET-AE0139-v1, Joint Video Experts Team (JVET) of ITU-T SG 16 WP 3 and ISO/IEC JTC 1/SC 29, 31st Meeting, Geneva, CH, Jul. 11-19, 2023, pp. 1-5.
Karczewicz M., et al., "Non-EE2: Improved Fixed Filters for ALF", JVET-AD0220-v2, Joint Video Experts Team (JVET) of ITU-T SG 16 WP 3 and ISO/IEC JTC 1/SC 29 30th Meeting, Antalya, TR, Apr. 21-28, 2023, pp. 1-3.
Karczewicz M., et al., "VVC In-Loop Filters", IEEE Transactions on Circuits and Systems for Video Technology, vol. 31, No. 10, Oct. 2021, Apr. 9, 2021, pp. 3907-3925.
Karczewicz M., et al.,"Non-EE2: Improved fixed filters for ALF", 30. JVET Meeting, Apr. 21, 2023-Apr. 28, 2023, Antalya, (The Joint Video Exploration Team of ISO/IEC JTC1/SC29/WG11 and ITU-T SG.16 ), No. JVET-AD0220, m62905, Apr. 15, 2023, XP030309010, 3 Pages.

* cited by examiner

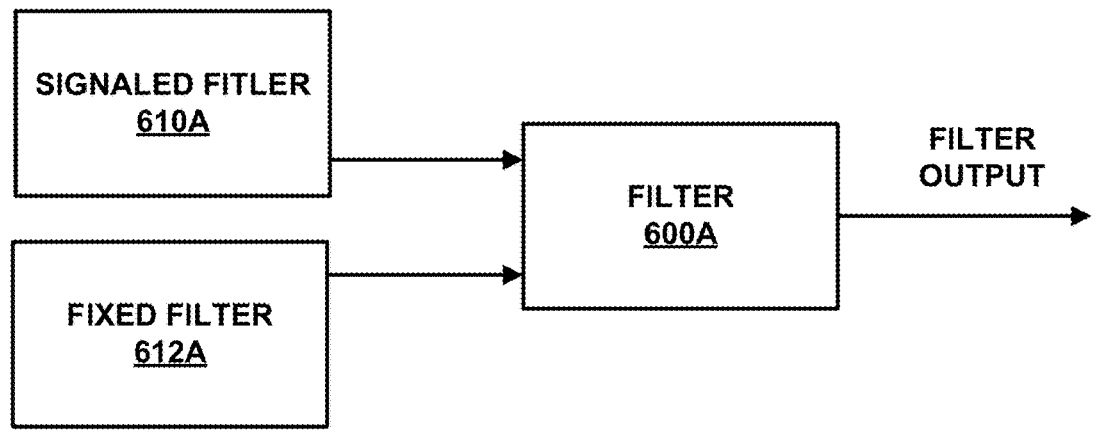
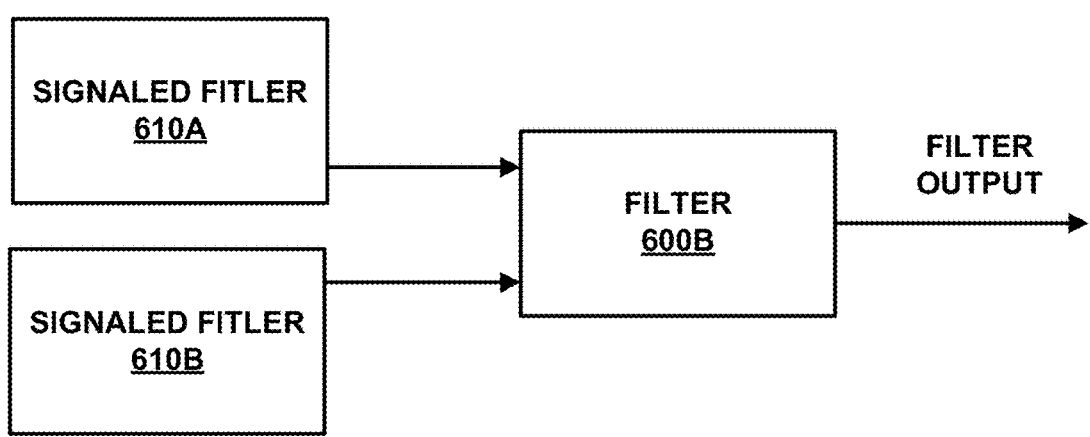
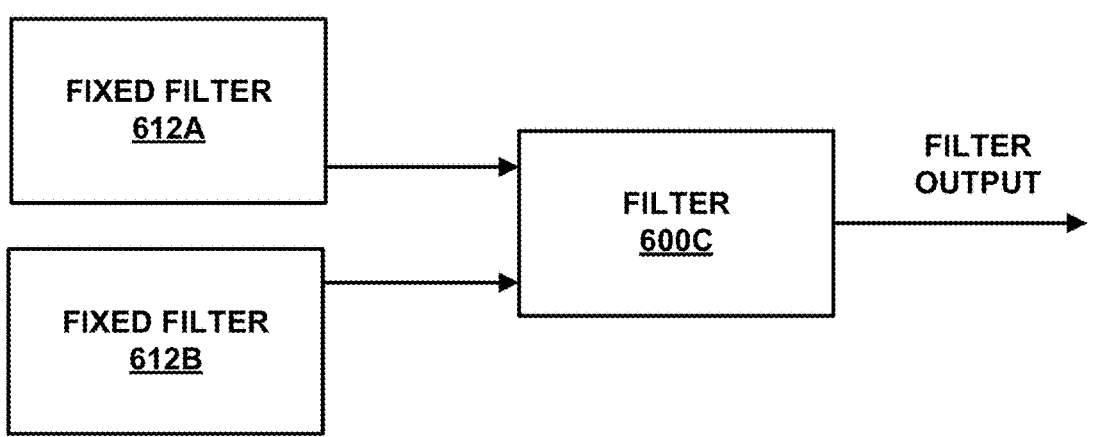
FIG. 2

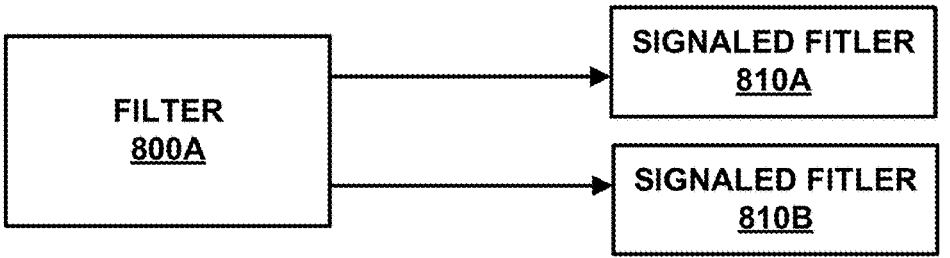
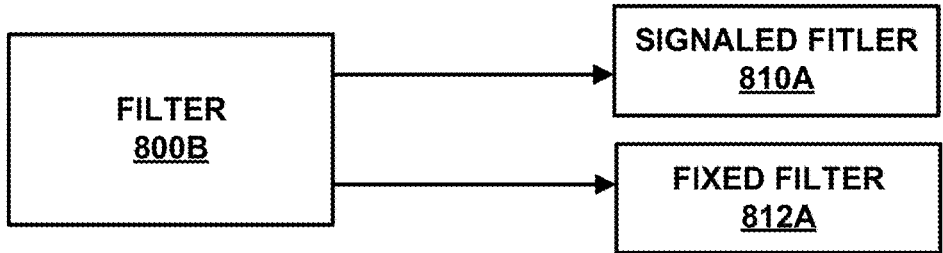
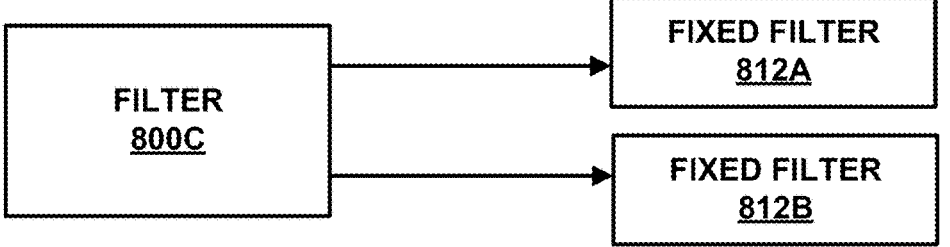
FIG. 4

400
PREDICT CURRENT BLOCK

402
CALCULATE RESIDUAL BLOCK
FOR CURRENT BLOCK

404
TRANSFORM AND QUANTIZE
RESIDUAL BLOCK

406
SCAN TRANSFORM
COEFFICIENTS OF RESIDUAL
BLOCK

408
ENTROPY ENCODE
TRANSFORM COEFFICIENTS

410
OUTPUT ENTROPY ENCODED
DATA OF BLOCK

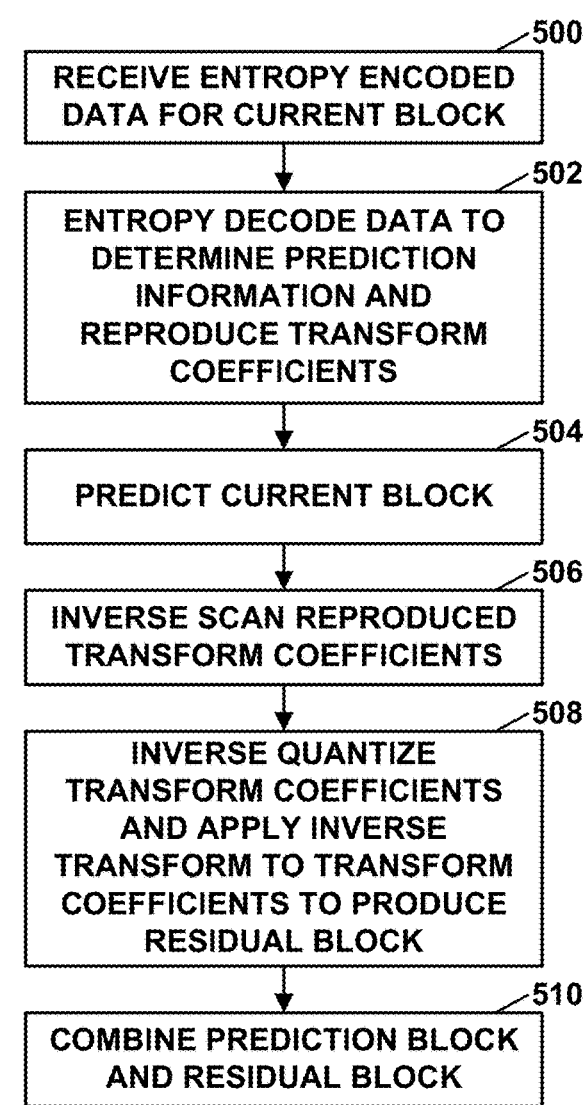

RECEIVE ENTROPY ENCODED DATA FOR CURRENT BLOCK ⟋500

ENTROPY DECODE DATA TO DETERMINE PREDICTION INFORMATION AND REPRODUCE TRANSFORM COEFFICIENTS ⟋502

PREDICT CURRENT BLOCK ⟋504

INVERSE SCAN REPRODUCED TRANSFORM COEFFICIENTS ⟋506

INVERSE QUANTIZE TRANSFORM COEFFICIENTS AND APPLY INVERSE TRANSFORM TO TRANSFORM COEFFICIENTS TO PRODUCE RESIDUAL BLOCK ⟋508

COMBINE PREDICTION BLOCK AND RESIDUAL BLOCK ⟋510

FIG. 8

RECEIVING VIDEO DATA — 900

APPLYING A FILTER TO A PLURALITY OF CATEGORIES OF SAMPLES OF THE VIDEO DATA — 902

RECEIVING A FIRST OUTPUT OF A
SIGNALED FILTER ⌐910

RECEIVING A SECOND OUTPUT OF A FIXED
FILTER ⌐914

APPLYING THE FILTER TO THE FIRST
OUTPUT AND THE SECOND OUTPUT ⌐914

ADAPTIVE VIDEO FILTER

This application claims the benefit of U.S. Provisional Patent Application No. 63/588,071, filed Oct. 5, 2023, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for adaptive video filtering. In particular, this disclosure describes an adaptive video filter that may be applied to the output of one or multiple of other filters. The techniques described herein may result in improved video quality, reduced bandwidth consumption, reduced use of processing power, and/or the like.

In one example, this disclosure describes a method including receiving video data, and applying a filter to a plurality of categories of samples of the video data. The plurality of categories of samples may include two or more of an input of a fixed filter, an output of the fixed filter, an input of a signaled filter, an output of the signaled filter, an input of an adaptive loop filter, an output of the adaptive loop filter, an input of a sample adaptive offset (SAO) filter, an output of the SAO filter, an input of a bilateral filter, an output of the bilateral filter, an input of a cross component SAO filter, an output of the cross component SAO filter, an input of a deblocking filter, an output of the deblocking filter, filtered reconstructed residual data, dequantized coefficients, filtered dequantized coefficients, a predictor, or a filtered predictor.

In another example, this disclosure describes an apparatus comprising a memory and processing circuitry in communication with the memory, the processing circuitry configured to receive video data, and apply a filter to a plurality of categories of samples of the video data.

In another example, this disclosure describes an apparatus comprising means for receiving video data, and means for applying a filter to a plurality of categories of samples of the video data.

In another example, this disclosure describes a non-transitory computer-readable storage medium storing instructions that, when executed, cause one or more processors configured to code video data to receive video data, and apply a filter to a plurality of categories of samples of the video data.

The details of one or more examples are set forth in the accompanying drawings and the description below. Other features, objects, and advantages will be apparent from the description, drawings, and claims.

BRIEF DESCRIPTION OF DRAWINGS

FIG. 2 illustrates block diagrams of example filters in accordance with an example of this disclosure.

FIG. 4 illustrates block diagrams of example filters in accordance with an example of this disclosure.

FIG. 8 is a flowchart illustrating an example method for decoding a current block in accordance with the techniques of this disclosure.

DETAILED DESCRIPTION

The techniques described herein may improve adaptive video filtering. In particular, this disclosure describes an adaptive video filter that may be applied to the output of one or multiple of other filters. These techniques may result in improved video quality, reduced bandwidth consumption, reduced use of processing power, and/or the like.

Figure 1:
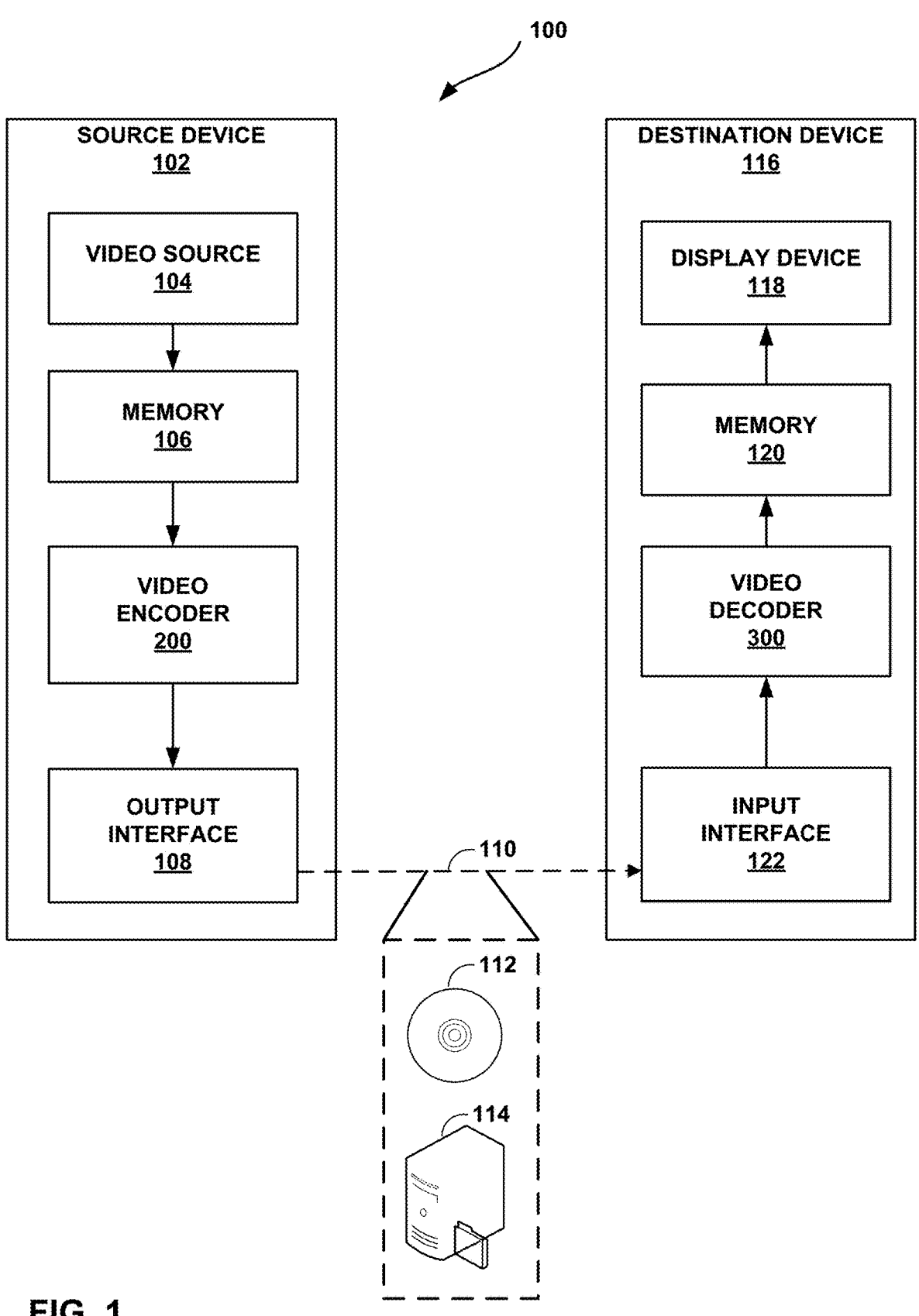
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for adaptive video filtering. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for adaptive video filtering. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder (e.g., audio codec), and may include appropriate MUX-DEMUX units, or other hardware and/or software, to handle multiplexed streams including both audio and video in a common data stream. Example audio codecs may include AAC, AC-3, AC-4, ALAC, ALS, AMBE, AMR, AMR-WB (G.722.2), AMR-WB+, aptx (various versions), ATRAC, BroadVoice (BV16, BV32), CELT, Enhanced AC-3 (E-AC-3), EVS, FLAC, G.711, G.722, G.722.1, G.722.2 (AMR-WB), G.723.1, G.726, G.728, G.729, G.729.1, GSM-FR, HE-AAC, iLBC, iSAC, LA Lyra, Monkey's Audio, MP1, MP2 (MPEG-1, 2 Audio Layer II), MP3, Musepack, Nellymoser Asao, OptimFROG, Opus, Sac, Satin, SBC, SILK, Siren 7, Speex, SVOPC, True Audio (TTA), TwinVQ, USAC, Vorbis (Ogg), WavPack, and Windows Media Aud.

Video encoder 200 and video decoder 300 each may be implemented as any of a variety of suitable encoder and/or decoder circuitry that includes a processing system, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use adaptive video filtering.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, as will be explained in more detail below video encoder 200 and video decoder 300 may be configured to receive video data, and apply a filter to a plurality of categories of samples of the video data.

In an example video encoder, the frame of an original video sequence is partitioned into rectangular regions or blocks, which may be encoded in Intra-mode (I-mode) or Inter-mode. The blocks may be coded using some kind of transform coding, such as DCT coding. However, pure transform-based coding only reduces the inter-pixel correlation within a particular block, without considering the inter-block correlation of pixels. Pure transform-based coding may still produce relatively high bit-rates for transmission. Current digital image coding standards may also exploit certain techniques that reduce the correlation of pixel values between blocks.

In general, blocks encoded in Inter mode are predicted from a number of previously coded frames. The prediction information of a block can be, for example, represented by a two-dimensional (2D) motion vector. For the blocks encoded in Intra-mode, the predicted block may be formed using spatial prediction from already encoded neighboring blocks within the same frame. The prediction error, e.g., the difference between the block being encoded and the predicted block, may be represented as a set of weighted basis functions of some discrete transform. The transform is typically performed on a block basis. The weights, e.g., transform coefficients, may be subsequently quantized. Quantization introduces a loss of information. Therefore, quantized transform coefficients may have a lower precision than the original transform coefficients.

Quantized transform coefficients, together with motion vectors and some control information, may form a coded sequence representation and may be referred to as syntax elements. Prior to transmission from a video encoder to a video decoder, syntax elements may be entropy coded so as to further reduce the number of bits needed for their (e.g., the syntax elements) representation.

In the video decoder, the block in the current frame is obtained by first constructing the prediction of the block in the same manner as in the video encoder and by adding to the prediction the compressed prediction error. The compressed prediction error may be found by weighting the transform basis functions using the quantized transform coefficients. The difference between the reconstructed frame and the original frame may be called reconstruction error.

In video coding, it is common to apply filtering in order to enhance the quality of a decoded video signal. A filter may be applied as a post-filter, where the filtered frame is not used for prediction of future frames. In other examples, the filter may be applied as an in-loop filter, where the filtered frame is used to predict future frame(s). A filter can be designed, for example, by minimizing the error between the original signal and the decoded filtered signal. Similarly to transform coefficients, the coefficients of the filter $h(k, l)$, $k=-K, \ldots, K, l=-K, \ldots K$ may be quantized, for example, as follows:

$$c(k, l) = \text{round}(normFactor \cdot h(k, l)).$$

The coefficients of the filter may then be coded and sent to the video decoder. The normFactor is usually equal to $2^n$. The larger the value of normFactor, the more precise the quantization, and the quantized filter coefficients $c(k, l)$ provide better performance. On the other hand, larger values of normFactor produce coefficients c(k, l) requiring more bits to transmit.

In the video decoder, the decoded filter coefficients c(k, l) are applied to the reconstructed image R(i, j) as follows:

$$\tilde{R}(i, j) = \sum_{k=-K}^{K} \sum_{l=-K}^{K} c(k, l)R(i + k, j + l), \tag{1}$$

where i and j are the coordinates of the pixels within a frame. The filter coefficients can also be applied to the differences f(k, l) between the to-be-filtered sample R(i, j) and its neighboring samples:

$$f(k, l) = R(i + k, j + l) - R(i, j).$$

In this case, the sample $\tilde{R}(x, y)$ may be obtained by adding the resulting sum to the reconstructed sample R(x, y). The differences f(k, l) may be modified by, for example, applying clipping.

Adaptive Loop Filter (ALF) with block-based adaption in VVC (See M. Karczewicz et al., "VVC in-loop filters", IEEE Trans. Circuits Syst. Video Technol., vol. 31, no. 10, pp. 3907-3925, October 2021) may be considered a state-of-the-art in-loop filter. With such an ALF filter, sub-block or pixel level filter adaptation may be applied. Each M×M block may be categorized into one out of 25 classes based on the directionality D of the block and the quantized value of activity A:

$$C = 5D + A.$$

Each class may have its own assigned filter.

A Laplacian-based classifier may be used to derive class C for the samples in a target block. A window that covers the target block may be used for classifying that particular target block. The activity and directionality are derived using values of the horizontal, vertical and two diagonal gradients calculated using 1-D Laplacian:

$$H_{k,l} = |2R(k, l) - R(k - 1, l) - R(k + 1, l)|,$$

$$V_{k,l} = |2R(k, l) - R(k, l - 1) - R(k, l + 1)|,$$

$$D1_{k,l} = |2R(k, l) - R(k - 1, l - 1) - R(k + 1, l + 1)|,$$

$$D2_{k,l} = |2R(k, l) - R(k - 1, l + 1) - R(k + 1, l - 1)|.$$

The sums of horizontal, vertical and two diagonal gradients within the window may be denoted, respectively, as $g_h$, $g_v$, $g_{d1}$ and $g_{d2}$. The directionality D may be determined by comparing the following with a set of thresholds.

$$r_{h,v} = \frac{\max(g_h, g_v)}{\min(g_h, g_v)}, r_{d1,d2} = \frac{\max(g_{d1}, g_{d2})}{\min(g_{d1}, g_{d2})}$$

The activity A may be derived by calculating a sum of $g_h$ and $g_v$ and comparing the activity A with the set of thresholds.

Before filtering, certain geometric transformations, such as rotation, diagonal and vertical flip, may be applied to the pixels in the filter support region (e.g., pixels which are multiplied by filtered coefficients) depending on the orientation of the gradient of the filtered pixel. These transformations increase similarity between different regions within the picture, e.g., their directionality. This can reduce the number of filters which have to be sent to the video decoder, and thus reduce a number of bits required to represent the filters, or additionally or alternatively, reduce the reconstruction error. Applying the transformations to the filter support region may be equivalent to applying the transformations directly to the filter coefficients.

To reduce the number of bits used to represent the filter coefficients, different classes may be merged. The information regarding which classes are to be merged may be provided by the video encoder to the video decoder by sending, for each of the 25 classes, an index i_C. Classes having the same index i_C may share the same filter.

The ALF coefficients of reference pictures may be stored and allowed to be reused as ALF coefficients of a current picture. For the current picture, the video encoder may use the ALF coefficients stored for the reference pictures, and bypass signaling the ALF coefficients to the video decoder. In this case, the video encoder may only signal an index to one of the reference pictures, and the stored ALF coefficients of the indicated reference picture may simply be inherited for the current picture.

In Y.-J. Chang, C.-C. Chen, J. Chen, J. Dong, H. E. Egilmez, N. Hu, H. Huang, M. Karczewicz, J. Li, B. Ray, K. Reuze, V. Seregin, N. Shlyakhov, L. Pham Van, H. Wang, Y. Zhang, Z. Zhang, "Compression efficiency methods beyond VVC" document JVET-U0100, 21st JVET meeting, January 2021 (hereinafter "Chang et al."), it is proposed to use three different classifiers ($C_0$, $C_1$ and $C_2$) and three different sets of filters ($F_0$, $F_1$ and $F_2$). Sets $F_0$ and $F_1$ contain fixed filters, with coefficients trained for classifiers $C_0$ and $C_1$. Coefficients of filters in $F_2$ are signaled. Which filter is to be used from a set $F_i$ for a given sample is decided by a class $C_i$ assigned to this sample using classifier $C_i$. All 3 classifiers are Laplacian based and differ from the classifier used in VVC by using a window having a different number of samples and a number of thresholds to determine activity and directionality.

In the Enhanced Compression Model version 9.0 (ECM-9.0), a third fixed filter, which is also called Gaussian filter, is applied to samples before a deblocking filter. A signalled filter is also applied to the output of the Gaussian filter.

In co-pending U.S. patent application Ser. No. 18/605,416, filed Mar. 14, 2024, a concatenated filtering is proposed. One filter may be applied to the output of another filter. A classifier may be applied to the output sample values of another filter.

To further improve the coding efficiency, U.S. patent application Ser. No. 18/605,416 describes the following techniques. Firstly, a difference-based classifier is described. Secondly, a multiple feature-based classifier is described. Such a classifier may be applied to both fixed and signaled filters. Thirdly, concatenated filtering is described. When concatenated filtering is applied, output sample values of a filter may be used as input sample values of another filter. Fourthly, a filter is described to be applied to sample values at multiple reconstruction stages. When sample values from one stage are not available and/or used, sample values from another stage may be used. Fifthly, when a filter is applied to sample values from only one stage, the difference derivation of the input samples may be disabled. These described techniques may be applied individually or in any combination.

The difference-based classifier is now described. For a target block in a reconstructed picture, to derive the class index C, video encoder 200 or video decoder 300 may calculate a value m.

For example, the value m may be the standard deviation, variance, median, or mean of a window p×q which may include the target block. In another example, the value m may be a sample value from the window.

The difference between each sample value and m may be calculated inside a window which may include the target block. This window may be the same p×q window or a different one. For example, video encoder 200 or video decoder 300 may determine the difference.

In one example, a window size may be different for different fixed filters. For example, when a Laplacian classifier is applied, the same window of samples may be used for the difference-based classifier.

Another value v may be calculated based on the derived differences. The value v may be a sum of the absolute differences, or a sum of the squared differences, or the square root of a sum of the squared differences, or any other combination based on the derived differences. For example, video encoder 200 or video decoder 300 may determine the value v.

The class index C may be derived from the value v. The value v may be further quantized to D by a scaling factor before deriving the class index. For example, video encoder 200 or video decoder 300 may determine the class index C and may apply the scaling factor, if used.

In one example, the scaling factor may be derived based on the activity value, the window size, and/or bit depth of a sample value in the window. In one example, the activity value is derived as a sum of values of the horizontal, and vertical gradients calculated using 1-D Laplacian. For example, video encoder 200 or video decoder 300 may determine the scaling factor and/or the activity value.

The quantized value $\hat{v}$ may be further clipped to be within the allowed class index range. The clipped value may be used as the class index C. For example, video encoder 200 or video decoder 300 may clip the quantized value $\hat{v}$.

For example, (x, y) may denote the coordinates of samples in the p×q window in a reconstructed picture. The mean value m of the p×q window may be calculated as $$m = \frac{\sum_{x,y} R(x, y)}{p*q}$$

Video encoder 200 or video decoder 300 may determine the mean value m.

The value v may be calculated as the squared root of a sum of squared differences between each sample and m in the p×q window $$v = \sqrt{\sum_{x,y}(R(x, y) - m)^2}$$

Video encoder 200 or video decoder 300 may determine the value v.

Based on a Laplacian-based classifier, the activity value of current block may be A.

Class index C may be derived as $$C = \max\left(0, \min\left(\frac{v}{s[A]*\sqrt{p*q}}, M - 1\right)\right),$$

where the scaling factor array s[ ]={2, 2, 4, 4, 8, 8, 8, 8, 16, 16, 16, 16, 32, 32, 32, 32} and the number of classes M=8. Video encoder 200 or video decoder 300 may determine the class index C.

The scaling factor may be further scaled based on the bit depth of a sample. In one example, s[A] may be further modified by multiplying $2^{bit\ depth-10}$, and class index $$C = \max\left(0, \min\left(\frac{v}{s[A]*\sqrt{p*q}*2^{(bit\ depth-10)}}, M - 1\right)\right)$$

In one example, $$\frac{v}{\sqrt{p*q}}$$

may be derived by accessing the sample values in one pass. As $$\frac{v}{\sqrt{p*q}} = \sqrt{\frac{\sum_{x,y}(R(x, y) - m)^2}{p*q}}$$

For example, if r=p*q, the variance may be calculated as $$\frac{\sum_{x,y}(R(x, y) - m)^2}{r} = \frac{\sum_{x,y} R(x, y)^2 - 2m*\sum_{x,y} R(x, y) + \sum_{x,y} m^2}{r}$$

$$= \frac{\sum_{x,y} R(x, y)^2 - 2*\frac{\sum_{x,y} R(x, y)}{r}*\sum_{x,y} R(x, y) + r*\left(\frac{\sum_{x,y} R(x, y)}{r}\right)^2}{r}$$

$$= \frac{\sum_{x,y} R(x, y)^2 - \frac{\left(\sum_{x,y} R(x, y)\right)^2}{r}}{r} = \frac{r \cdot \sum_{x,y} R(x, y)^2 - \left(\sum_{x,y} R(x, y)\right)^2}{r^2}$$

Therefore, when the value v is calculated as the squared root of a sum of squared differences between each sample and m in the p×q window, the sum of the sample values and the sum of squared sample values in this window may be calculated to derive v and further class index C.

When the value v is calculated, embodiments of the technology may introduce an approximation of r (referred to as r') into the calculation. The purpose of using r' could be allowing software/hardware design of the technology to be achieve without a division. In another word, the division (/r) may be replaced with bit shifting.

As an example, for an implementation that using p=10, q=10. The accurate value of r=10*10=100, The $r^2$ in the equation can be replaced by $$r'^2 = 128^2 \cdot \frac{8}{13}.$$

In this case the equation became:

$$\frac{r \cdot \sum_{x,y} R(x,y)^2 - \left(\sum_{x,y} R(x,y)\right)^2}{r'^2} =$$

$$\frac{13 \cdot \left(r \cdot \sum_{x,y} R(x,y)^2 - \left(\sum_{x,y} R(x,y)\right)^2\right)}{8 \cdot 128^2}$$

Where the division operation can be implemented with bit-shifting:

$$= 13 \cdot \left(r \cdot \sum_{x,y} R(x,y)^2 - \left(\sum_{x,y} R(x,y)\right)^2\right) >> 17$$

Additionally, the arithmetic operations involved in the calculation of v can be split into multiple stages to reduce the number of bits that needed for intermediate values. As an example. The approximation shown in the previous example can be modified from $$\frac{13 \cdot \left(r \cdot \sum_{x,y} R(x,y)^2 - \left(\sum_{x,y} R(x,y)\right)^2\right)}{8 \cdot 128^2}$$

to:

$$\frac{13 \cdot \left(\frac{\left(r \cdot \sum_{x,y} R(x,y)^2 - \left(\sum_{x,y} R(x,y)\right)^2\right)}{8}\right)}{128^2} =$$

$$\left(13 \cdot \left(\left(r \cdot \sum_{x,y} R(x,y)^2 - \left(\sum_{x,y} R(x,y)\right)^2\right) >> 3\right)\right) >> 14$$

The multiple feature-based classifier is now discussed. In this technique, the final class index may be derived based on multiple (e.g., a plurality) of derived individual class indices. A mapping process may be introduced to derive the final class index from the combination of the individual class indices. For example, video encoder 200 or video decoder 300 may determine the final class index.

In one example, the mapping process may be represented as follows. For example, $C_i$, with i=0 . . . N−1, may denote the i-th individual classifier and $M_i$, with i=0 . . . N−1, may denote the total number of classes of i-th individual classifier. For a given sample, $C_i$ may denote the class index derived from i-th individual classifier $C_i$ with i=0 . . . N−1. The class index C may be derived as $$C = \sum_{i=0}^{N-1} \left(C_i * \prod_{j=i-1}^{0} M_j\right)$$

For example, video encoder 200 or video decoder 300 may determine the class index C.

The derived class index C may be further mapped to the final class index. For example, two or more class index C values may be mapped to the same final class index indicating the same filter to be used.

In another two-feature based classifier example, $C_0$ and $C_1$ may denote the class index derived from the earlier described difference-based classifier and a Laplacian-based classifier, respectively. The final class index may be derived as $$C = C_0 * M_1 + C_1,$$

where $M_1$ is the total number of classes in classifier $C_1$.

Concatenated filtering is now described. When multiple filters are applied, one filter may be applied to the output of another filter. A classifier may be applied to the output sample values of another filter. For example, video encoder 200 or video decoder 300 may apply one filter and/or a classifier to output of another filter.

For example, in Chang et al., two fixed filters may be both applied to input sample values to ALF. In one example, one fixed filter may be applied to the output sample values of another fixed filter. The outputs, after applying the two filters, may be used as an input to the ALF filtering.

In another example, a fixed filter may be applied to several types of inputs. In one example, the output sample values of the other fixed filter may be used as an input and the sample values before ALF (e.g., samples before a deblocking filter, reconstructed residual samples, or predictors) may be used as another input. In some examples, a geometric transpose may be applied to one type of input. In some examples, a geometric transpose may not be applied to one type of input. In some examples, a type of geometric transpose may be the same for all types of input. In some examples, the type of geometric transpose may be determined by one type of input and the determined transpose may be applied to other (or all) types of input.

A class index for each fixed filter may be derived from the reconstructed samples (e.g., input to ALF). In another example, a class index for a fixed filter may be derived from the output sample values after applying another fixed filter.

A filter applied to reconstructed residual sample values is now described. A filter may be applied at the same time to the sample inputs obtained at different stages of the reconstruction process. In other words, video encoder 200 or video decoder 300 may apply a filter to samples at one stage of the reconstruction process and reapply the same filter to samples at another stage of the reconstruction process. For example, video encoder 200 or video decoder 300 may apply a filter to sample values before and after some of the in-loop filters, such as a deblocking filter, a bilateral filter, an SAO, a cross-component SAO and the like.

In another example, the sample values to which filter is applied may be obtained after the Intra or Inter prediction. In another example, the sample values to which the filter is applied may be obtained after the inverse transform, which is the reconstructed residual.

If an input from some reconstruction stage is not available or not used, then such input may be replaced with another input for filtering purposes. In some sense, it may be seen as such input samples are used twice in the filtering. The clipping values or clipping indices applied to the same samples maybe averaged (first) before the filtering process. In another example, when input is not available or not used, then the part of the filter corresponding to that input is not applied, or alternatively that part of the filter may be applied to a zero input.

The disabling of a difference derivation for a single input is now discussed. In some cases, a filter may be applied to the difference between samples at different stages, however when only a residual input is used, then a plurality of input stages are replaced with the one residual input for the filtering, and when the difference is derived it may produce a zero difference as the residual is subtracted from the residual itself. Such a calculation may be wasteful of processing resources.

In such case, video encoder 200 or video decoder 300 may use zero as the difference, e.g., without performing the calculation. Alternatively, the difference may not be applied and just the residual input may be used without deriving the difference. In another example, a residual input multiplied by some factor, (in one example the factor may be equal to −1, in the previous sample (or in another example) the factor may be equal to 1) may be used.

EXAMPLES

This disclosure describes techniques where video encoder 200 and video decoder 300 may be configured to apply a filter to the input or output of one or multiple of other filters. That is, video encoder 200 and video decoder 300 may be configured to apply a filter to the input and/or output of a plurality of filters. The filter of this disclosure may be a post filter or an in-loop filter.

Additionally, in some examples, video encoder 200 and video decoder 300 may be configured to apply a classifier m to the output sample values of one or multiple of other filters. The filters that may be used with the techniques of this disclosure may be any filter described above. The filter may be a fixed filter or a signaled filter. In addition, the classifier may be a classifier of a fixed filter or a classifier or a signaled filter.

Accordingly, video encoder 200 and video decoder 300 may be configured to apply a classifier to an output sample value of the plurality of categories of samples of the video data. The classifier may be a classifier for a fixed filter or a classifier of a signaled filter.

For example, video encoder 200 and video decoder 300 may be configured to apply a filter to one category or multiple categories of samples generated from any combination of the sources below:

Input and/or output of other fixed filters (e.g., fixed filters with a Laplacian-based classifier and/or a Gaussian filter)

Input and/or output of other signaled filters

Input and/or output of an adaptive loop filter (ALF)

Input and/or output of sample adaptive offset (SAO) filter, a bilateral filter, and/or a cross-component sample adaptive offset filter (CC-SAO)

Input and/or output of deblocking filter

Reconstructed residual data

Filtered reconstructed residual data

Dequantized coefficients

Filtered dequantized coefficients

A Predictor

A Filtered predictor

In a general example of the disclosure, video encoder 200 and video decoder 300 may be configured to receive video data and apply a filter to a plurality of categories of samples of the video data. That is, video encoder 200 and video decoder 300 may apply the filter to the input of a plurality of categories of samples, as shown above. In addition, video encoder 200 and video decoder 300 may apply the filter to the output of a plurality of categories of samples. Said another way, the filter of this disclosure may take more than one category for samples as input.

The plurality of categories of samples may include two or more of an input of a fixed filter, an output of the fixed filter, an input of a signaled filter, an output of the signaled filter, an input of an adaptive loop filter, an output of the adaptive loop filter, an input of an SAO filter, an output of the SAO filter, an input of a bilateral filter, an output of the bilateral filter, an input of a cross component SAO filter, an output of the cross component SAO filter, an input of a deblocking filter, an output of the deblocking filter, filtered reconstructed residual data, dequantized coefficients, filtered dequantized coefficients, a predictor, or a filtered predictor.

As a more specific example, video encoder 200 and video decoder 300 may receive a first output of a signaled filter, receive a second output of a fixed filter, and apply the filter to the first output and the second output. FIG. 2 shows various examples of this filter structure. Filter 600A receives inputs from both signaled filter 610A and fixed filter 612A. Filter 600B receives inputs from both signaled filter 610A and a different signaled filter 610B. Filter 600C receives inputs from both fixed filter 612A and a different fixed filter 612B. In the example of FIG. 2, the signaled filter may include any of an adaptive loop filter, an SAO filter, a bilateral filter, a cross component SAO filter, or deblocking filter. Any type of fixed filter may be used.

Figure 3:
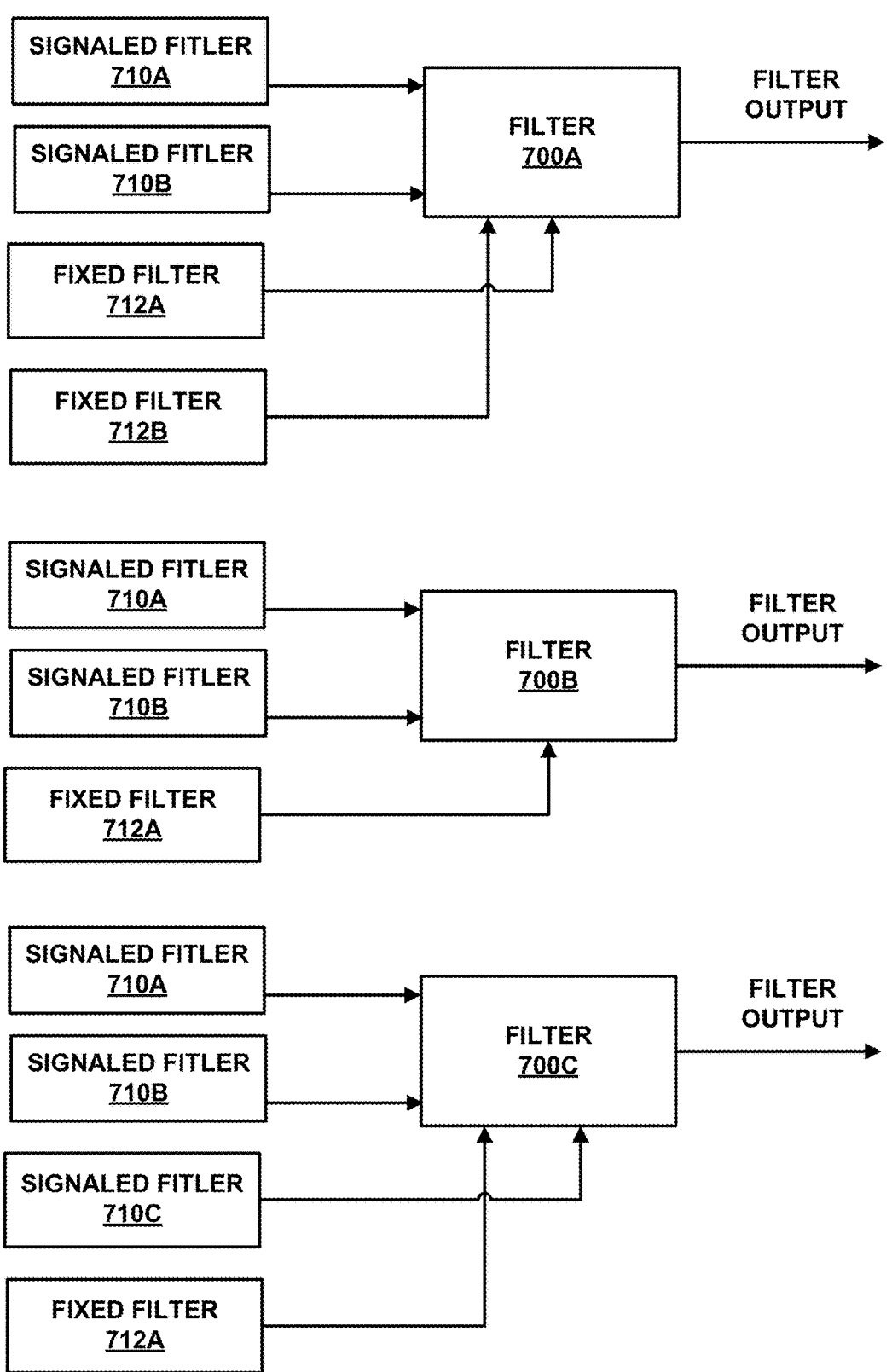
FIG. 3 illustrates block diagrams of example filters in accordance with an example of this disclosure.

In another example of the disclosure, video encoder 200 and video decoder 300 may receive a first respective output of two or more signaled filters, and receive a second respective output of one or more fixed filters. Video encoder 200 and video decoder 300 may apply the filter to the first respective outputs and the second respective outputs. FIG. 3 shows various examples of this filter structure, though other combinations are within the scope of this disclosure. Filter 700A receives inputs from signaled filter 710A, a different signaled filter 710B, fixed filter 712A, and a different fixed filter 712B. Filter 700B receive inputs from signaled filter 710A, a different signaled filter 710B, and a single fixed filter 712A. Filter 700C receives inputs from signaled filter 710A, a different signaled filter 710B, another different signaled filter 710C, and a single fixed filter 712A. Again, the signaled filter may include any of an adaptive loop filter, an SAO filter, a bilateral filter, a cross component SAO filter, or deblocking filter. Any type of fixed filter may be used.

The filter of this disclosure is not limited to being applied to the outputs of multiple different filters. In other examples, the output of the filter of this disclosure may be the input to multiple different other filters. FIG. 4 shows various examples of this filter structure, though other combinations are within the scope of this disclosure. The output of filter 800A may be the input to both signaled filter 810A and a different signaled filter 810B. The output of filter 800B may be the input to signaled filter 810A and fixed filter 812A. The output of filter 800C may be the input to fixed filter 812A and a different fixed filter 812B. Again, the signaled filter may include any of an adaptive loop filter, an SAO filter, a bilateral filter, a cross component SAO filter, or deblocking filter. Any type of fixed filter may be used.

Figure 5:
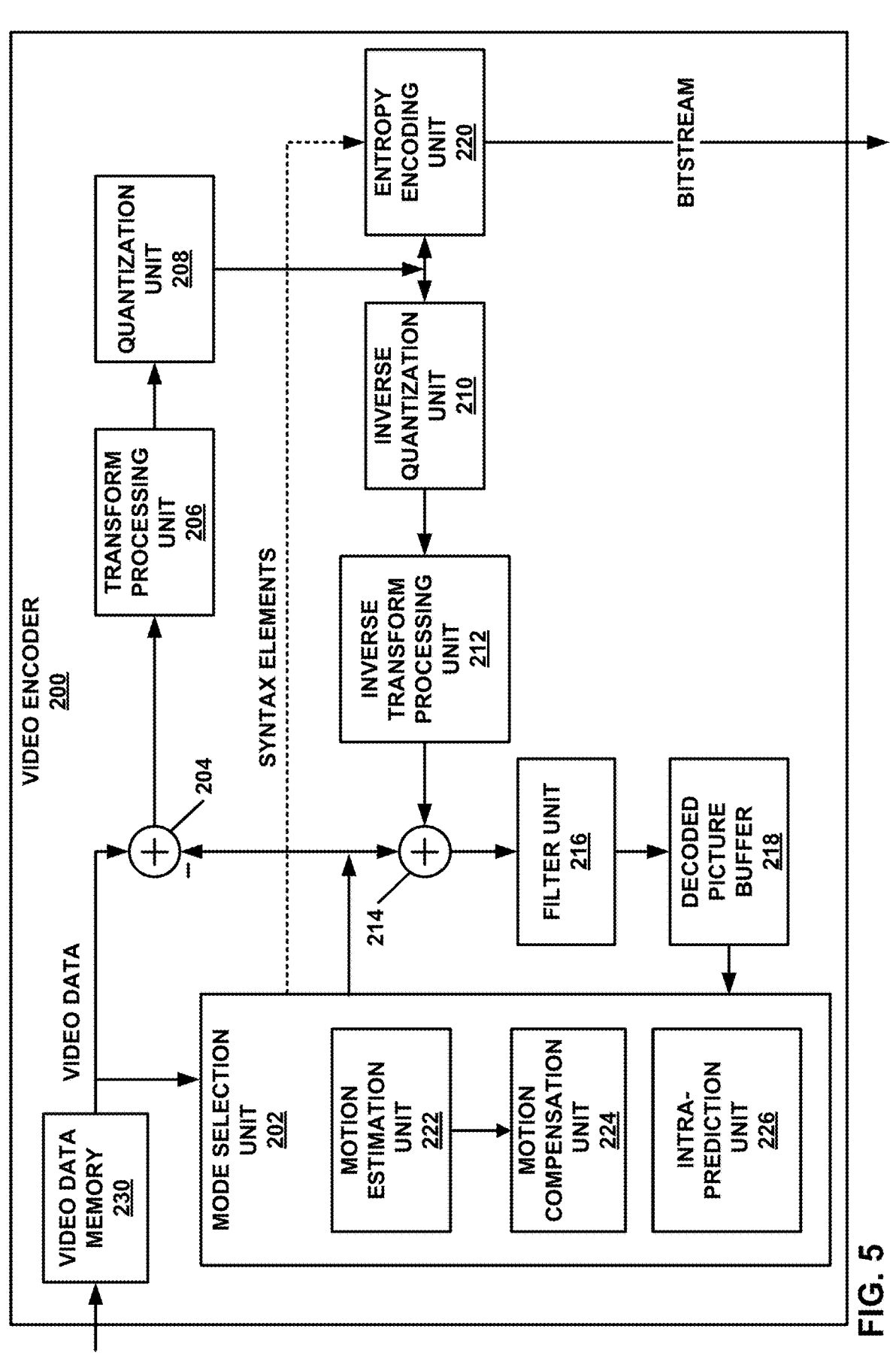
FIG. 5 is a block diagram illustrating an example video encoder that may perform the techniques of this disclosure.

FIG. 5 is a block diagram illustrating an example video encoder 200 that may perform the techniques of this disclosure. FIG. 5 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 5, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 is an example of a memory system that may store video data to be encoded by the components of video encoder 200. Video encoder 200 may receive the video data stored in video data memory 230 from, for example, video source 104 (FIG. 1). DPB 218 is an example of a memory system that may act as a reference picture memory that stores reference video data for use in prediction of subsequent video data by video encoder 200. Video data memory 230 and DPB 218 may each be formed by any of a variety of one or more memory devices or memory units, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 5 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

Filter unit 216 may be further configured to perform any of the adaptive video filter techniques discussed above with reference to FIGS. 2-4. For example, filter unit 216 may be configured to receive video data and apply a filter to a plurality of categories of samples of the video data.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to apply a filter to the input or output of one or more categories of samples.

Figure 6:
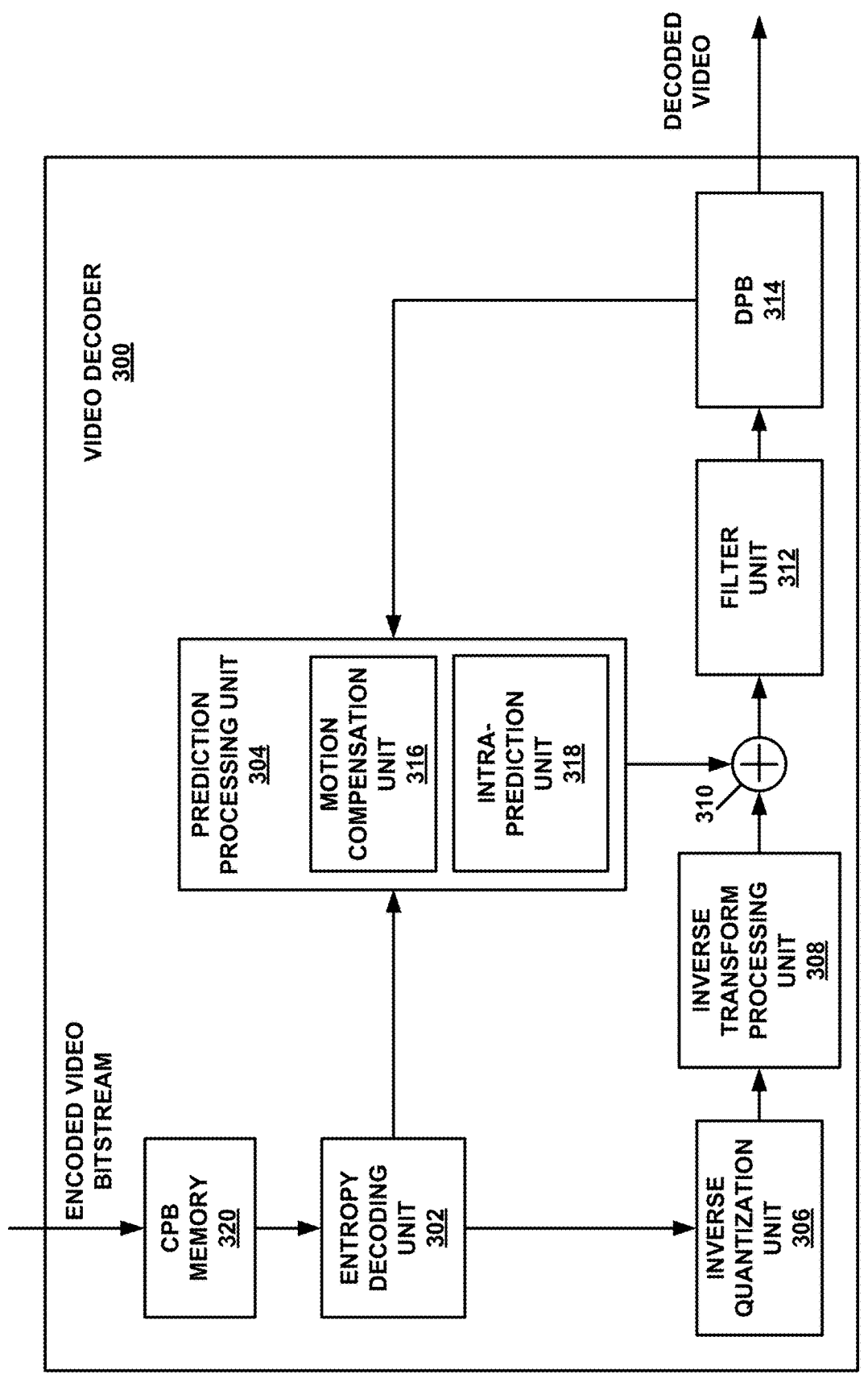
FIG. 6 is a block diagram illustrating an example video decoder that may perform the techniques of this disclosure.

FIG. 6 is a block diagram illustrating an example video decoder 300 that may perform the techniques of this disclosure. FIG. 6 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 6, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 is an example of a memory system that may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 is an example of a memory system that generally stores decoded pictures, which video decoder 300 may output and/or use as reference video data when decoding subsequent data or pictures of the encoded video bitstream. CPB memory 320 and DPB 314 may each be formed by any of a variety of memory devices or memory units, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 6 are illustrated to assist with understanding the operations performed by video decoder 300. The units may be implemented as fixed-function circuits, programmable circuits, or a combination thereof. Similar to FIG. 5, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 5).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 5). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Filter unit 312 may be further configured to perform any of the adaptive video filter techniques discussed above with reference to FIGS. 2-4. For example, filter unit 312 may be configured to receive video data and apply a filter to a plurality of categories of samples of the video data.

In this manner, video decoder 300 represents an example of a video decoding device including a memory configured to store video data, and one or more processing units implemented in circuitry and configured to apply a filter to the input or output of one or more categories of samples.

Figure 7:
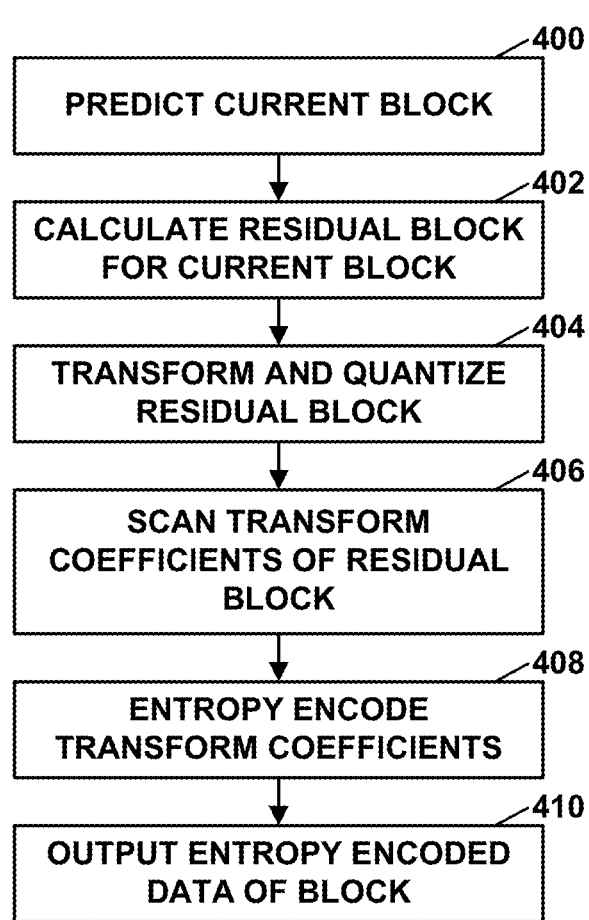
FIG. 7 is a flowchart illustrating an example method for encoding a current block in accordance with the techniques of this disclosure.

FIG. 7 is a flowchart illustrating an example method for encoding a current block in accordance with the techniques of this disclosure. The current block may be or include a current CU. Although described with respect to video encoder 200 (FIGS. 1 and 5), it should be understood that other devices may be configured to perform a method similar to that of FIG. 7.

In this example, video encoder 200 initially predicts the current block (400). For example, video encoder 200 may form a prediction block for the current block. Video encoder 200 may then calculate a residual block for the current block (402). To calculate the residual block, video encoder 200 may calculate a difference between the original, unencoded block and the prediction block for the current block. Video encoder 200 may then transform the residual block and quantize transform coefficients of the residual block (404).

Next, video encoder 200 may scan the quantized transform coefficients of the residual block (406). During the scan, or following the scan, video encoder 200 may entropy encode the transform coefficients (408). For example, video encoder 200 may encode the transform coefficients using CAVLC or CABAC. Video encoder 200 may then output the entropy encoded data of the block (410).

FIG. 8 is a flowchart illustrating an example method for decoding a current block of video data in accordance with the techniques of this disclosure. The current block may be or include a current CU. Although described with respect to video decoder 300 (FIGS. 1 and 6), it should be understood that other devices may be configured to perform a method similar to that of FIG. 8.

Video decoder 300 may receive entropy encoded data for the current block, such as entropy encoded prediction information and entropy encoded data for transform coefficients of a residual block corresponding to the current block (500). Video decoder 300 may entropy decode the entropy encoded data to determine prediction information for the current block and to reproduce transform coefficients of the residual block (502). Video decoder 300 may predict the current block (504), e.g., using an intra- or inter-prediction mode as indicated by the prediction information for the current block, to calculate a prediction block for the current block. Video decoder 300 may then inverse scan the reproduced transform coefficients (506), to create a block of quantized transform coefficients. Video decoder 300 may then inverse quantize the transform coefficients and apply an inverse transform to the transform coefficients to produce a residual block (508). Video decoder 300 may ultimately decode the current block by combining the prediction block and the residual block (510).

Figure 9:
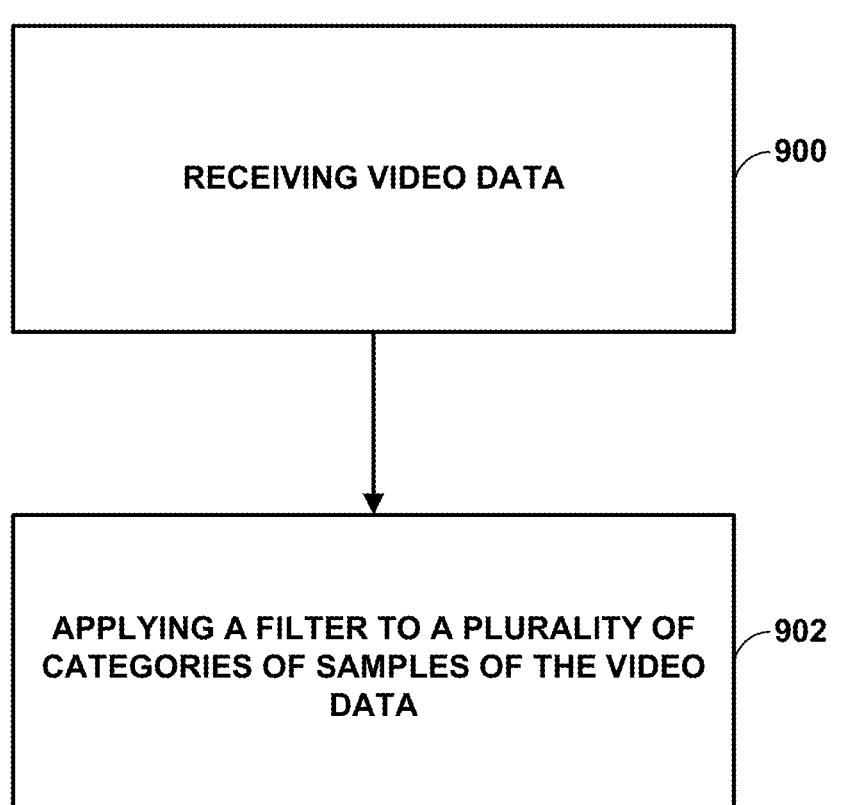
FIG. 9 is a flowchart illustrating an example method in accordance with the techniques of this disclosure.

FIG. 9 is a flowchart illustrating an example method in accordance with the techniques of this disclosure. The techniques of FIG. 9 may be performed by one or more components of video encoder 200 and video decoder 300, including filter unit 216 and filter unit 312, respectively.

In one example, of the disclosure, video encoder 200 and video decoder 300 may be configured to receive video data (900), and apply a filter to a plurality of categories of samples of the video data (902). In one example, the plurality of categories of samples includes two or more of an input of a fixed filter, an output of the fixed filter, an input of a signaled filter, an output of the signaled filter, an input of an adaptive loop filter, an output of the adaptive loop filter, an input of a sample adaptive offset (SAO) filter, an output of the SAO filter, an input of a bilateral filter, an output of the bilateral filter, an input of a cross component SAO filter, an output of the cross component SAO filter, an input of a deblocking filter, an output of the deblocking filter, filtered reconstructed residual data, dequantized coefficients, filtered dequantized coefficients, a predictor, or a filtered predictor.

Figure 10:
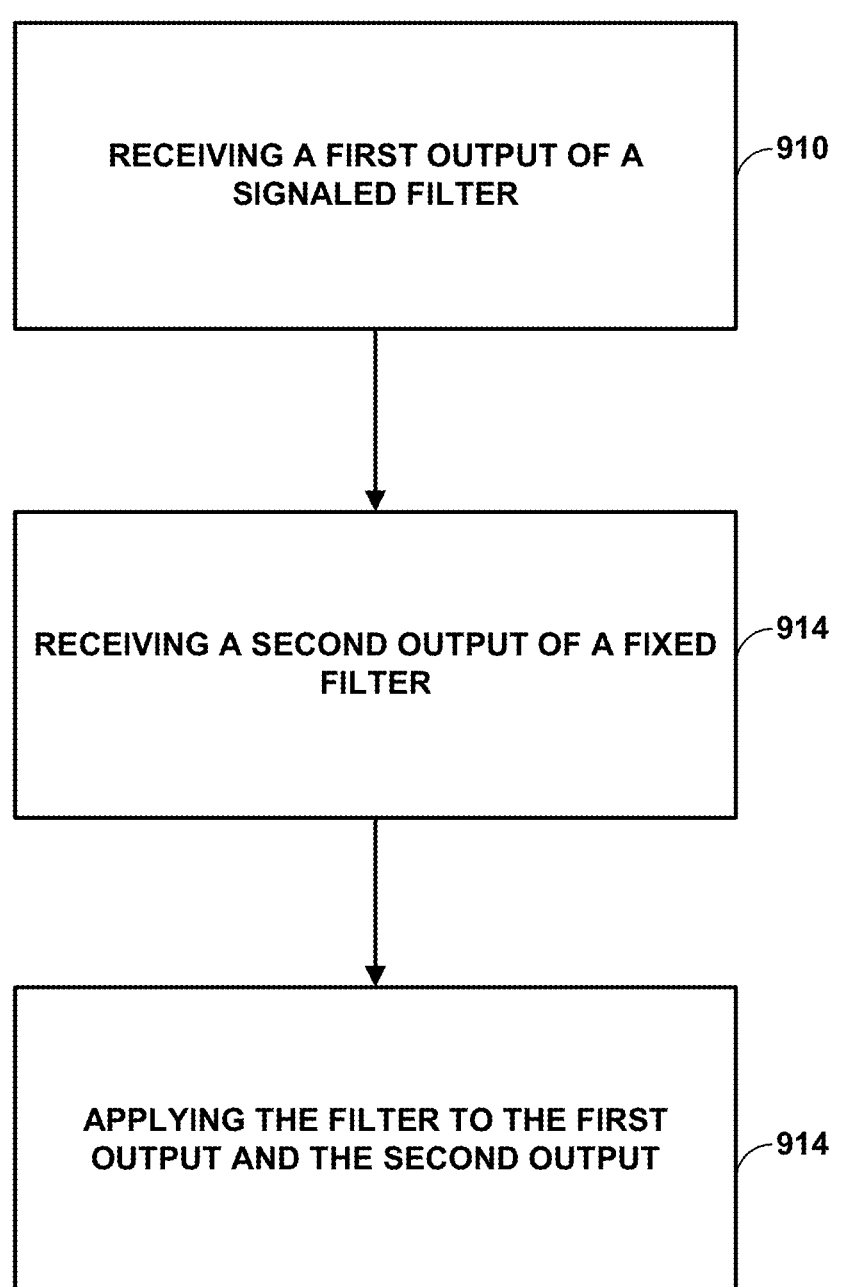
FIG. 10 is a flowchart illustrating another example method in accordance with the techniques of this disclosure.

FIG. 10 is a flowchart illustrating another example method in accordance with the techniques of this disclosure. More specifically, FIG. 10 illustrates a specific example of apply the filter to the plurality of categories of samples of the video data. For example, video encoder 200 and video decoder 300 may be configured to receive a first output of a signaled filter (910), receive a second output of a fixed filter (912), and apply the filter to the first output and the second output (914). In this example, the signaled filter includes one of an adaptive loop filter, a sample adaptive offset (SAO) filter, a bilateral filter, a cross component SAO filter, or deblocking filter.

In another example, to apply the filter to the plurality of categories of samples of the video data, video encoder 200 and video decoder 300 may be configured to receive a first respective output of two or more signaled filters, receive a second respective output of one or more fixed filters, and apply the filter to the first respective outputs and the second respective outputs. In this example, the two or more signaled filters includes one or more adaptive loop filters, one or more sample adaptive offset (SAO) filters, one or more bilateral filters, one or more cross component SAO filters, one or more deblocking filters.

In either of the examples of FIG. 9 or FIG. 10, video encoder 200 and video decoder 300 may be configured to apply a classifier to an output sample value of the plurality of categories of samples of the video data. In one example, the classifier is a classifier for a fixed filter or a classifier of a signaled filter.

The following numbered clauses illustrate one or more aspects of the devices and techniques described in this disclosure.

Aspect 1A—A method of coding video data, the method comprising: applying a filter to the input or output of one or more categories of samples.

Aspect 2A—The method of Aspect 1A, applying the filter to the input or output of the one or more categories of samples comprises: applying the filter to the input or output of a plurality of categories of samples.

Aspect 3A—The method of Aspect 2A, wherein the plurality of categories of samples includes one or more of: an input of a fixed filter, an output of the fixed filter, an input of a signaled filter, an output of the signaled filter, an input of an adaptive loop filter, an output of the adaptive loop filter, an input of a sample adaptive offset (SAO) filter, an output of the SAO filter, an input of a bilateral filter, an output of the bilateral filter, an input of a cross component SAO filter, an output of the cross component SAO filter, an input of a deblocking filter, an output of the deblocking filter, filtered reconstructed residual data, dequantized coefficients, filtered dequantized coefficients, a predictor, or a filtered predictor.

Aspect 4A—The method of Aspect 1A, further comprising: applying a classifier to output sample value of the one or more categories of samples.

Aspect 5A—The method of Aspect 4A, wherein the classifier is a classifier for a fixed filter or a classifier of a signaled filter.

Aspect 6A—The method of any of Aspects 1A-5A, wherein coding comprises decoding.

Aspect 7A—The method of any of Aspects 1A-5A, wherein coding comprises encoding.

Aspect 8A—A device for coding video data, the device comprising one or more means for performing the method of any of Aspects 1A-7A.

Aspect 9A—The device of Aspect 8A, wherein the one or more means comprise one or more processors implemented in circuitry.

Aspect 10A—The device of any of claims 8A and 9A, further comprising a memory to store the video data.

Aspect 11A—The device of any of Aspects 8A-10A, further comprising a display configured to display decoded video data.

Aspect 12A—The device of any of Aspects 8A-11A, wherein the device comprises one or more of a camera, a computer, a mobile device, a broadcast receiver device, or a set-top box.

Aspect 13A—The device of any of Aspects 8A-12A, wherein the device comprises a video decoder.

Aspect 14A—The device of any of Aspects 8A-13A, wherein the device comprises a video encoder.

Aspect 15A—A computer-readable storage medium having stored thereon instructions that, when executed, cause one or more processors to perform the method of any of Aspects 1A-7A.

Aspect 1B—A method of coding video data, the method comprising: receiving video data; and applying a filter to a plurality of categories of samples of the video data.

Aspect 2B—The method of Aspect 1B, wherein the plurality of categories of samples includes two or more of: an input of a fixed filter, an output of the fixed filter, an input of a signaled filter, an output of the signaled filter, an input of an adaptive loop filter, an output of the adaptive loop filter, an input of a sample adaptive offset (SAO) filter, an output of the SAO filter, an input of a bilateral filter, an output of the bilateral filter, an input of a cross component SAO filter, an output of the cross component SAO filter, an input of a deblocking filter, an output of the deblocking filter, filtered reconstructed residual data, dequantized coefficients, filtered dequantized coefficients, a predictor, or a filtered predictor.

Aspect 3B—The method of any of Aspects 1B-2B, wherein applying the filter to the plurality of categories of samples of the video data comprises: receiving a first output of a signaled filter; receiving a second output of a fixed filter; and applying the filter to the first output and the second output.

Aspect 4B—The method of Aspect 3B, wherein the signaled filter includes one of an adaptive loop filter, a sample adaptive offset (SAO) filter, a bilateral filter, a cross component SAO filter, or deblocking filter.

Aspect 5B—The method of any of Aspects 1B-2B, wherein applying the filter to the plurality of categories of samples of the video data comprises: receiving a first respective output of two or more signaled filters; receiving a second respective output of one or more fixed filters; and applying the filter to the first respective outputs and the second respective outputs.

Aspect 6B—The method of Aspect 5B, wherein the two or more signaled filters include one or more adaptive loop filters, one or more sample adaptive offset (SAO) filters, one or more bilateral filters, one or more cross component SAO filters, one or more deblocking filters.

Aspect 7B—The method of any of Aspects 1B-6B, further comprising: applying a classifier to an output sample value of the plurality of categories of samples of the video data.

Aspect 8B—The method of Aspect 7B, wherein the classifier is a classifier for a fixed filter or a classifier of a signaled filter.

Aspect 9B—The method of any of Aspects 1B-8B, wherein coding comprises decoding.

Aspect 10B—The method of any of Aspects 1B-8B, wherein coding comprises encoding.

Aspect 11B—An apparatus configured to code video data, the apparatus comprising: a memory; and processing circuitry in communication with the memory, the processing circuitry configured to: receive video data; and apply a filter to a plurality of categories of samples of the video data.

Aspect 12B—The apparatus of Aspect 11B, wherein the plurality of categories of samples includes two or more of: an input of a fixed filter, an output of the fixed filter, an input of a signaled filter, an output of the signaled filter, an input of an adaptive loop filter, an output of the adaptive loop filter, an input of a sample adaptive offset (SAO) filter, an output of the SAO filter, an input of a bilateral filter, an output of the bilateral filter, an input of a cross component SAO filter, an output of the cross component SAO filter, an input of a deblocking filter, an output of the deblocking filter, filtered reconstructed residual data, dequantized coefficients, filtered dequantized coefficients, a predictor, or a filtered predictor.

Aspect 13B—The apparatus of any of Aspects 11B-12B, wherein to apply the filter to the plurality of categories of samples of the video data, the processing circuitry is further configured to: receive a first output of a signaled filter; receive a second output of a fixed filter; and apply the filter to the first output and the second output.

Aspect 14B—The apparatus of Aspect 13B, wherein the signaled filter includes one of an adaptive loop filter, a sample adaptive offset (SAO) filter, a bilateral filter, a cross component SAO filter, or deblocking filter.

Aspect 15B—The apparatus of any of Aspects 11B-12B, wherein to apply the filter to the plurality of categories of samples of the video data, the processing circuitry is further configured to: receive a first respective output of two or more signaled filters; receive a second respective output of one or more fixed filters; and apply the filter to the first respective outputs and the second respective outputs.

Aspect 16B—The apparatus of Aspect 15B, wherein the two or more signaled filters include one or more adaptive loop filters, one or more sample adaptive offset (SAO) filters, one or more bilateral filters, one or more cross component SAO filters, one or more deblocking filters.

Aspect 17B—The apparatus of any of Aspects 11B-16B, wherein the processing circuitry is further configured to: apply a classifier to an output sample value of the plurality of categories of samples of the video data.

Aspect 18B—The apparatus of Aspect 17B, wherein the classifier is a classifier for a fixed filter or a classifier of a signaled filter.

Aspect 19B—The apparatus of any of Aspects 11B-18B, wherein the apparatus configured to decode video data.

Aspect 20B—The apparatus of any of Aspects 11B-18B, wherein the apparatus configured to encode video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
receiving video data; and
applying a filter to a plurality of categories of samples of the video data, comprising:
receiving a first output of a signaled filter;
receiving a second output of a fixed filter; and
applying the filter to the first output and the second output.

2. The method of claim 1, wherein the plurality of categories of samples includes two or more of:
an input of a fixed filter, an output of the fixed filter,
an input of a signaled filter,
an output of the signaled filter,
an input of an adaptive loop filter,
an output of the adaptive loop filter,
an input of a sample adaptive offset (SAO) filter,
an output of the SAO filter,
an input of a bilateral filter,
an output of the bilateral filter,
an input of a cross component SAO filter,
an output of the cross component SAO filter,
an input of a deblocking filter,
an output of the deblocking filter,
filtered reconstructed residual data,
dequantized coefficients,
filtered dequantized coefficients,
a predictor, or
a filtered predictor.

3. The method of claim 1, wherein the signaled filter includes one of an adaptive loop filter, a sample adaptive offset (SAO) filter, a bilateral filter, a cross component SAO filter, or deblocking filter.

4. The method of claim 1, wherein applying the filter to the plurality of categories of samples of the video data comprises:

receiving a first respective output of two or more signaled filters;
receiving a second respective output of one or more fixed filters; and
applying the filter to the first respective outputs and the second respective outputs.

5. The method of claim 4, wherein the two or more signaled filters include one or more adaptive loop filters, one or more sample adaptive offset (SAO) filters, one or more bilateral filters, one or more cross component SAO filters, one or more deblocking filters.

6. The method of claim 1, further comprising:

applying a classifier to an output sample value of the plurality of categories of samples of the video data.

7. The method of claim 6, wherein the classifier is a classifier for a fixed filter or a classifier of a signaled filter.

8. The method of claim 1, wherein coding comprises decoding.

9. The method of claim 1, wherein coding comprises encoding.

10. An apparatus configured to code video data, the apparatus comprising:

a memory; and
processing circuitry in communication with the memory, the processing circuitry configured to:
receive video data; and
apply a filter to a plurality of categories of samples of the video data, wherein to apply the filter to the plurality of categories of samples of the video data, the processing circuitry is further configured to:
receive a first output of a signaled filter;

receive a second output of a fixed filter; and
apply the filter to the first output and the second output.

11. The apparatus of claim 10, wherein the plurality of categories of samples includes two or more of:

an input of a fixed filter,
an output of the fixed filter,
an input of a signaled filter,
an output of the signaled filter,
an input of an adaptive loop filter,
an output of the adaptive loop filter,
an input of a sample adaptive offset (SAO) filter,
an output of the SAO filter,
an input of a bilateral filter,
an output of the bilateral filter,
an input of a cross component SAO filter,
an output of the cross component SAO filter,
an input of a deblocking filter,
an output of the deblocking filter,
filtered reconstructed residual data,
dequantized coefficients,
filtered dequantized coefficients,
a predictor, or
a filtered predictor.

12. The apparatus of claim 10, wherein the signaled filter includes one of an adaptive loop filter, a sample adaptive offset (SAO) filter, a bilateral filter, a cross component SAO filter, or deblocking filter.

13. The apparatus of claim 10, wherein to apply the filter to the plurality of categories of samples of the video data, the processing circuitry is further configured to:

receive a first respective output of two or more signaled filters;
receive a second respective output of one or more fixed filters; and
apply the filter to the first respective outputs and the second respective outputs.

14. The apparatus of claim 13, wherein the two or more signaled filters include one or more adaptive loop filters, one or more sample adaptive offset (SAO) filters, one or more bilateral filters, one or more cross component SAO filters, one or more deblocking filters.

15. The apparatus of claim 10, wherein the processing circuitry is further configured to:

apply a classifier to an output sample value of the plurality of categories of samples of the video data.

16. The apparatus of claim 15, wherein the classifier is a classifier for a fixed filter or a classifier of a signaled filter.

17. The apparatus of claim 10, wherein the apparatus configured to decode video data.

18. The apparatus of claim 10, wherein the apparatus configured to encode video data.

* * * * *